(12) United States Patent
Ma et al.

(10) Patent No.: US 7,562,056 B2
(45) Date of Patent: Jul. 14, 2009

(54) METHOD AND SYSTEM FOR LEARNING AN ATTENTION MODEL FOR AN IMAGE

(75) Inventors: Wei-Ying Ma, Beijing (CN); Xing Xie, Beijing (CN)

(73) Assignee: Microsoft Corporation, Redmond, WA (US)

( * ) Notice: Subject to any disclaimer, the term of this patent is extended or adjusted under 35 U.S.C. 154(b) by 523 days.

(21) Appl. No.: 10/963,930

(22) Filed: Oct. 12, 2004

(65) Prior Publication Data

US 2006/0112031 A1   May 25, 2006

(51) Int. Cl.
*G06E 1/00* (2006.01)
(52) U.S. Cl. .................... 706/20; 382/180; 382/174; 382/175; 382/176; 375/240.16
(58) Field of Classification Search .................... 706/20
See application file for complete search history.

(56) References Cited

U.S. PATENT DOCUMENTS

| 5,870,683 | A  | * | 2/1999  | Wells et al. ............... 455/566 |
| 6,232,974 | B1 | * | 5/2001  | Horvitz et al. ............ 345/419 |
| 6,246,779 | B1 | * | 6/2001  | Fukui et al. ............... 382/103 |
| 6,278,793 | B1 | * | 8/2001  | Gur et al. .................. 382/128 |
| 6,670,963 | B2 | * | 12/2003 | Osberger ................... 345/629 |
| 6,792,144 | B1 | * | 9/2004  | Yan et al. .................. 382/190 |
| 6,934,415 | B2 | * | 8/2005  | Stentiford ................. 382/205 |
| 7,116,716 | B2 | * | 10/2006 | Ma et al. .................. 375/240.16 |
| 7,260,261 | B2 | * | 8/2007  | Xie et al. ................... 382/173 |
| 2004/0088726 | A1 | * | 5/2004 | Ma et al. ...................... 725/46 |
| 2004/0165784 | A1 | | 8/2004 | Xie et al. |
| 2005/0047647 | A1 | * | 3/2005 | Rutishauser et al. ........ 382/159 |

OTHER PUBLICATIONS

"Video Summarization Based on User Log Enhanced Link Analysis", B. Yu, Wei-Ying Ma, K. Nahrstedt, H.-J. Zhang, International Multimedia Conference, Proceedings of the 11th ACM International Conf. on Multimedia, Nov. 2-8, 2003, pp. 382-391.*

(Continued)

*Primary Examiner*—David R Vincent
*Assistant Examiner*—Mai T Tran
(74) *Attorney, Agent, or Firm*—Perkins Coie LLP

(57) ABSTRACT

A system for learning an attention model for an image based on user navigation actions while viewing the image is provided. An attention model learning system generates an initial attention model based on static features derived from the image. The learning system logs the actions of users as they view the image. The learning system identifies from the actions of the users those areas of the image that may be of user interest. After the learning system identifies areas that may be of user interest, the learning system attempts to identify attention objects based on those identified areas. After identifying the user attention objects, the learning system updates the attention model for the image to reflect the additional information provided by the user attention objects.

33 Claims, 15 Drawing Sheets

OTHER PUBLICATIONS

"A user attention model for video summarization", Y.-F. Ma, L. Lu, H.-J. Zhang, M. Li, International Multimedia Conference, Proceedings of the 10$^{th}$ ACM International Conf. on Multimedia Dec. 2002, pp. 533-542.*

"Visual attention based image browsing on mobile devices", X. Fan, X. Xie, W.-Y. Ma, H.-J. Zhang, H.-Q. Zhou, Multimedia and Expo, 2003, ICME 03, Proceedings 2003 International Conf. on Jul. 6-9, 2003, vol. 1, pp. I-53-I-56.*

"Learning user interest for image browsing on small-form-factor devices", X. Xie, H. Liu, S. Goumaz, W.-Y. Ma, Conference on Human Factors in Computing Systems, Proceedings of the SIGCHI, Apr. 2-7, 2005, pp. 671-680.*

Chen, Liqun et al., "A Visual Attention Model for Adapting Images on Small Displays," Technical Report, MSR-TR-2002-125, Microsoft Research, Microsoft Corporation, Nov. 4, 2002 (21 pages).

Chandra, Surendar et al., "Transcoding Characteristics of Web Images," Tech. Rep. CS-1999, Department of Computer Science, Duke University, Nov. 1999 (15 pages).

Itti, Laurent et al., "Short Papers: A Model of Saliency-Based Visual Attention for Rapid Scene Analysis," IEEE Transactions on Pattern Analysis and Machine Intelligence, vol. 20, No. 11, Nov. 1998 (pp. 1254-1259).

Itti, Laurent and Koch, Christof, "A Comparison of Feature Combination Strategies for Saliency-Based Visual Attention Systems," California Institute of Technology, Computation and Neural Systems Programs, MSC 139-74, Pasadena, California, Proc. SPIE (Human Vision and Electronic Imaging IV), Jan. 1999 (10 pages).

Itti, Laurent and Koch, Christof, "Computational Modelling of Visual Attention," Nature Reviews, Neuroscience, vol. 2, Mar. 2001 (11 pages).

* cited by examiner

METHOD AND SYSTEM FOR LEARNING AN ATTENTION MODEL FOR AN IMAGE

TECHNICAL FIELD

The described technology relates to generating an attention model for an image.

BACKGROUND

It can be particularly challenging to view images on small devices such as cell phones, mobile computers, and personal digital assistants ("PDAs"). These devices typically have a very small display area in which to display an image. To display an image, the devices may use software and information that is designed for devices with much larger display areas. For example, these devices may use a web browser to display standard size web pages. If an image in a high resolution is displayed in such a small display area, the image may need to be displayed in a much lower resolution to fit the entire image. With such a low resolution, however, the user may not be able to see the details of the image. Alternatively, if the image is displayed in full resolution in a small display area, only a small portion of the image can be displayed at once. To view other portions of the image, the user needs to navigate (e.g., scrolling and zooming) to view those portions. Because such devices are typically very small, it can be difficult for a user to perform such navigation.

Currently, most image browsers used by small devices offer only a simplified set of user interface features that are directly ported from a desktop image browser. Few designers of image browsers, however, take the characteristics of a small device into consideration when designing their user interfaces. Small devices are different from larger devices in input capabilities, processing power, and screen characteristics. For example, since small devices usually do not have a keyboard or mouse, it can be difficult to navigate around an image. Since small devices do not have the processing power of their large-device counterparts, it can be time-consuming to open high-resolution images, browse a large number of images, edit large images, and so on. The primary difference from a user's perspective is display area size. Because the display area is small, a user is forced to scroll and zoom in to areas of interest. Such scrolling and zooming are typically not necessary on a device with a large display area.

Attention models for images have been developed to help improve the experience of a user viewing an image on a small display area. Attention models seek to identify objects, referred to as "attention objects," within an image that may be the focus of user attention and thus of interest to a user. For example, an attention model may seek to identify faces or text within an image as being areas that may be of interest. The attention models may calculate a score, referred to as an "attention value," of likely user interest in each attention object. When the image is displayed, an image browser can use the attention model to direct the user's attention to attention objects with high attention values. By displaying portions of an image based on the attention values of the attention objects, an image browser can focus user attention to areas of the image that are likely to be of interest and thus reduce the navigation needed to locate areas of interest.

A difficulty with current attention models, however, is that they focus on identifying attention objects from the content of the image itself. It can be very difficult to develop an effective algorithm to identify areas that may be of interest for images covering diverse domains. For example, the areas of interest for an architect and a meteorologist in an image of a city skyline may be vastly different. As another example, a face in an image of a portrait may be of interest, but a face in an image of fans at a football game may not be of interest. As such, it would be desirable to have a technique to effectively identify areas of user interest within an image.

SUMMARY

A system for learning an attention model for an image based on user navigation actions while viewing the image is provided. The learning system logs the actions of users as they view the image. The learning system identifies from the actions of the users those areas of the image that may be of user interest.

After the learning system identifies areas that may be of user interest, the learning system attempts to identify attention objects based on those identified areas.

After identifying the user attention objects, the learning system updates the attention model for the image to reflect the additional information provided by the user attention objects.

DETAILED DESCRIPTION

Figure 1:
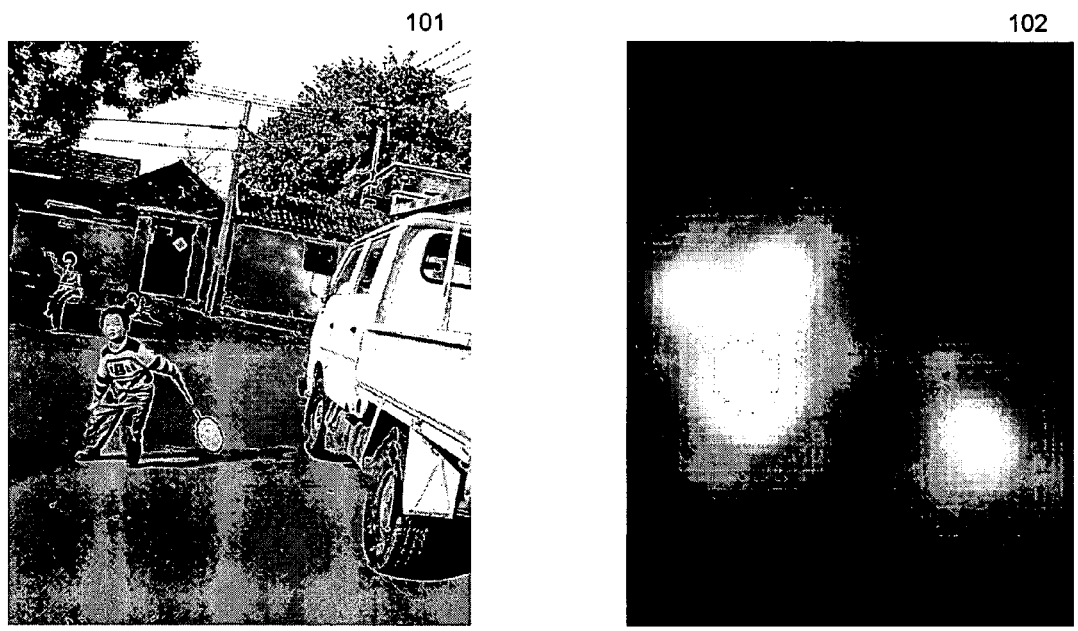
FIG. 1 is a diagram that illustrates a visual representation of a user interest map in one embodiment.

A method and system for learning an attention model for an image based on user navigation actions while viewing the image is provided. In one embodiment, an attention model learning system generates an initial attention model based on static features (e.g., faces and text) derived from the image. The learning system then logs the actions of users as they view the image. For example, the learning system may log a scroll action, an indication of the location and size of the scrolled-to area, and the time of the action. The learning system identifies from the actions of the users those areas of the image that may be of user interest. For example, if a user scrolls to an area and then scrolls to another area one second later, the user probably did not focus their attention on the area that was in view for one second, and thus the area may not be of user interest. In contrast, if the user scrolls to an area and takes no other action for 20 seconds, the user may be focusing their attention on that area, and thus that area may be of user interest. After the learning system identifies areas that may be of user interest, the learning system attempts to identify attention objects based on those identified areas. These attention objects are referred to as "user attention objects" since they are identified based on actions of users viewing the image. After identifying the user attention objects, the learning system updates the attention model for the image to reflect the additional information provided by the user attention objects. The updated attention model can then be used to direct the viewing of the image. The learning system may receive a log of user actions each time that a user views the image. Thus, the learning system can continually update the attention model based on the actions of users as they view the image, resulting in a dynamic attention model. Since a user-based attention model is based on user actions while viewing an image, it can model areas of user interest more accurately than traditional techniques that are based on static features.

In one embodiment, the learning system identifies areas of an image that may be of user interest. The learning system first identifies those actions that indicate the user is interested in the area of the image currently being viewed, referred to as an "interesting action." For example, an interesting action may be the scrolling to an area that is zoomed in and taking no further action for 60 seconds. Since the areas may overlap, may be displayed at different zoom ratios, and may be viewed multiple times, the learning system combines the information of multiple interesting actions to score user interest in underlying portions of the image. To generate the scores, the learning system divides the image into "image zones," which may be rectangular (e.g., 20×20 pixels). The learning system calculates a score, referred to as an "interest score," for each image zone based on the interesting actions that relate to that image zone. For example, if a user views the entire image in a low resolution (i.e., a low zoom ratio) for a long time, the learning system may consider that interesting action to not indicate a particular interest in any portion of the image and increment the score of each image zone by a very small amount or not at all. In contrast, if a user views a small portion of an image in a high resolution (i.e., a high zoom ratio), the learning system may consider that interesting action to indicate a high degree of interest and increment the score of each image zone underlying the portion being displayed by a large amount. The interest scores of the image zones represent a "user interest map" of the image where those image zones with a high score have a high user interest, and those image zones with a low score have a low user interest.

In one embodiment, the learning system identifies user attention objects for an image based on a user interest map for the image. The learning system first identifies "primary attention objects" and then attempts to identify "secondary attention objects" by "growing" the primary attention objects. The learning system selects each image zone of the user interest map with a high interest score. If the image zone is within a previously defined user attention object, then the learning system selects that user attention object as a primary attention object. If the image zone is not within a previously defined user attention object, then the learning system creates a new attention object and designates it as a primary attention object. The learning system sets the size of the new attention object based on a display ratio associated with the image zone and its attention value based on the interest score of the image zone. To identify the secondary attention objects, the learning system initializes a secondary attention object to each primary attention object and then tries to grow each secondary attention object to encompass adjacent image zones that may have sufficiently high interest scores (e.g., exceed a threshold). For example, the learning system may first check the interest scores of the image zones to the right, left, above, and below the secondary attention object. If any of the checked interest scores are sufficient, then the learning system grows the secondary attention object in that direction to encompass the image zone. The learning system may grow the secondary attention objects so that each maintains a rectangular shape. If so, the learning system may also check the scores of the image zones that are at the corners of a secondary attention object. The learning system grows a secondary attention object until it encounters no adjacent image zones with a sufficient interest score. The learning system may also limit the growth of a secondary attention object to ensure that its aspect ratio is appropriate, that is, its height or width is not too narrow. The learning system then promotes to primary attention objects those secondary attention objects based on their relationship to primary attention objects. If a secondary attention object encompasses a primary attention object, then the learning system promotes the secondary attention object as appropriate. It is appropriate to promote the secondary attention object when it is significantly or minimally larger than the encompassed primary attention object. If the secondary attention object is promoted because it is minimally larger than the primary attention object, then the encompassed primary attention object is removed. A secondary attention object that is significantly larger represents a new area of user interest and thus the learning system creates a new attention object. A secondary object that is minimally larger represents a refinement of an existing attention object. The learning system then updates the attention model based on the primary attention objects.

FIG. 1 is a diagram that illustrates a visual representation of a user interest map in one embodiment. A user interest map identifies those image zones that are of user interest by an interest score. The learning system generates the user interest map 102 for image 101. The user interest map has an interest score for each image zone. The interest score may be based on the time a user spent viewing an area of the image that included the image zone as indicated by the interesting actions. This visual representation of user interest map 102 represents the interest scores as intensity values. In this example, the user interest map indicates that the user focused their attention on the children and the lower rear portion of the truck. In one embodiment, the learning system sets the attributes of Table 1 for each image zone.

TABLE 1

| Name | Description |
|---|---|
| $T_{view}$ | total weighted viewing time of this image zone (i.e., interest score) |
| $R_{view}$ | best display ratio of this image zone |
| $T_{first}$ | time the image zone was first viewed |
| $N_{view}$ | number of different viewings of this image zone |

The learning system sets $R_{view}$ to the maximum display ratio of an interesting action for the image zone. The high display ratio may indicate a high level of user interest. The learning system sets $T_{view}$ based on distance from the focus of the action, which may be considered to be the center of the display area. The learning system sets $T_{view}$ according to the following equation:

$$T_{view} = \sum_{i=1}^{n} ActionDuration * \frac{1 + \cos(d\pi/d_{max})}{2} \quad (1)$$

where n is the number of interesting actions that relate to this image zone, d is the distance from the $i^{th}$ image zone to the focus point, and $d_{max}$ is the distance from the edge of the display area to the focus point of the $i^{th}$ image zone.

Figure 2:
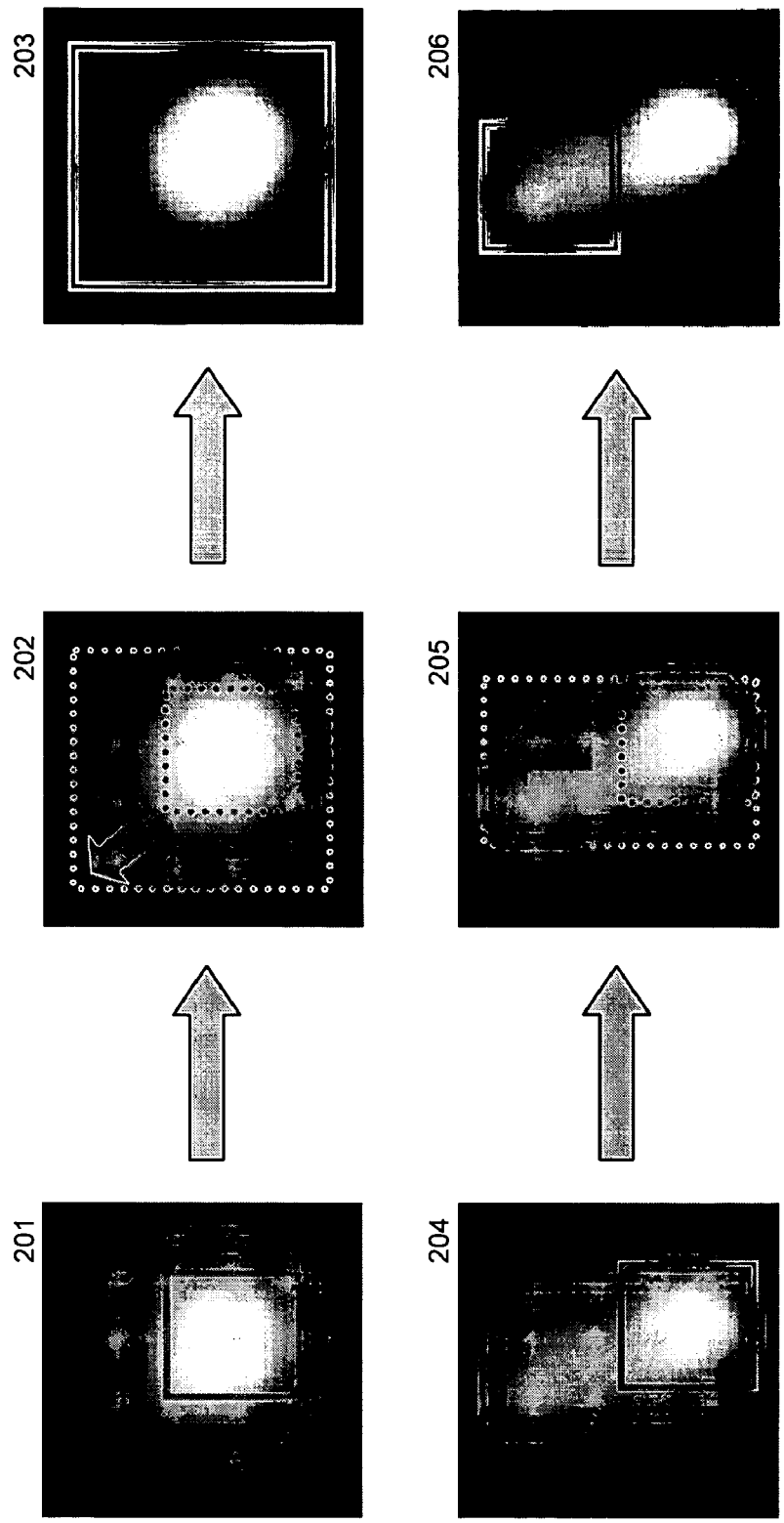
FIG. 2 is a diagram that illustrates the growing of a secondary attention object.

FIG. 2 is a diagram that illustrates the growing of a secondary attention object. User interest map 201 shows a secondary attention object that has been initialized to a primary attention object. User interest map 202 shows the growth of the secondary attention object mostly in the upper and left directions to encompass image zones with sufficient interest scores. User interest map 203 shows the final secondary attention object. User interest map 204 shows another secondary attention object that has been initialized to another primary attention object. User interest map 205 shows the growth of the secondary attention object with an undesirable aspect ratio (i.e., too narrow). User interest map 206 shows the final adjusted secondary attention object.

Figure 3:
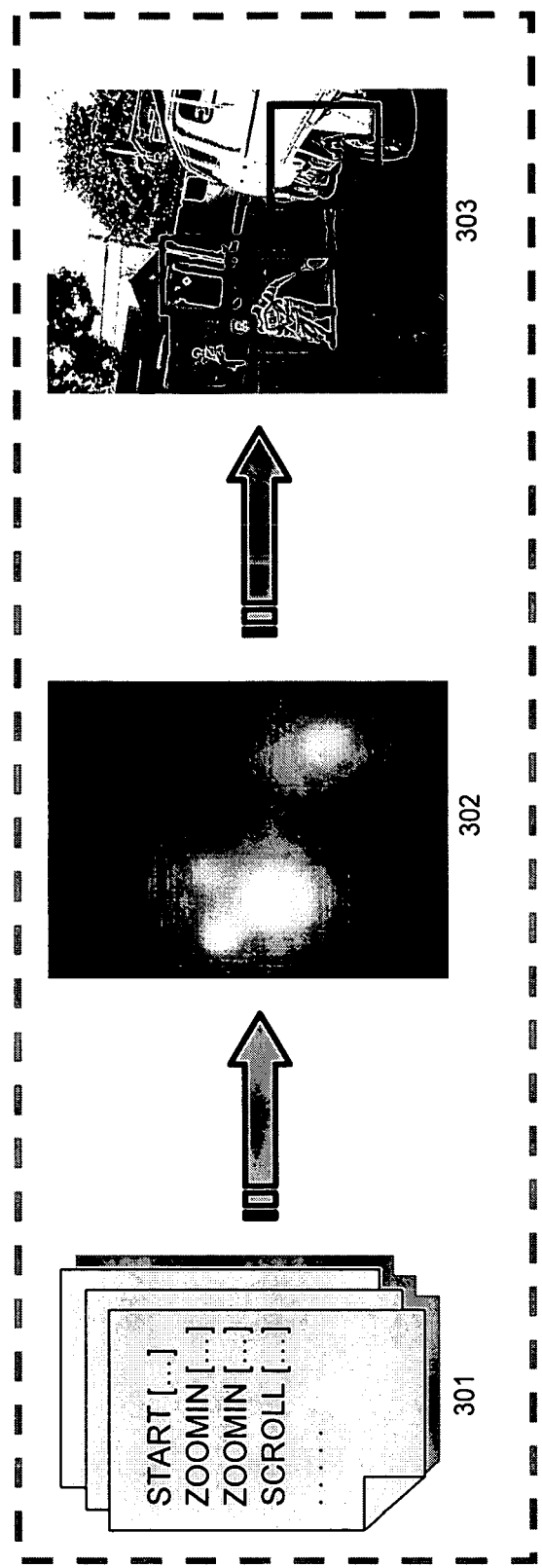
FIG. 3 is a block diagram that illustrates the processing of the learning system in one embodiment.

FIG. 3 is a block diagram that illustrates the processing of the learning system in one embodiment. The learning system collects user browse logs 301 generated by devices through which users viewed images. The learning system then generates a user interest map 302 from each browse log, identifies primary attention objects 303 based on the user interest map, and updates the attention model for the image based on the primary attention objects. The attention model of an image is defined as a set of attention objects with the following attributes:

$$\{AO_i\} = \{ROI_i, AV_i, MPS_i, MPT_i\}, 1 \leq i \leq N \quad (2)$$

where $AO_i$ is the $i^{th}$ attention object within the image, $ROI_i$ is the region of interest of $AO_i$, $AV_i$ is the attention value of $AO_i$, $MPS_i$ is the minimal perceptible size of $AO_i$, $MPT_i$ is the minimal perceptible time of $AO_i$, and N is the total number of attention objects.

Figure 4:
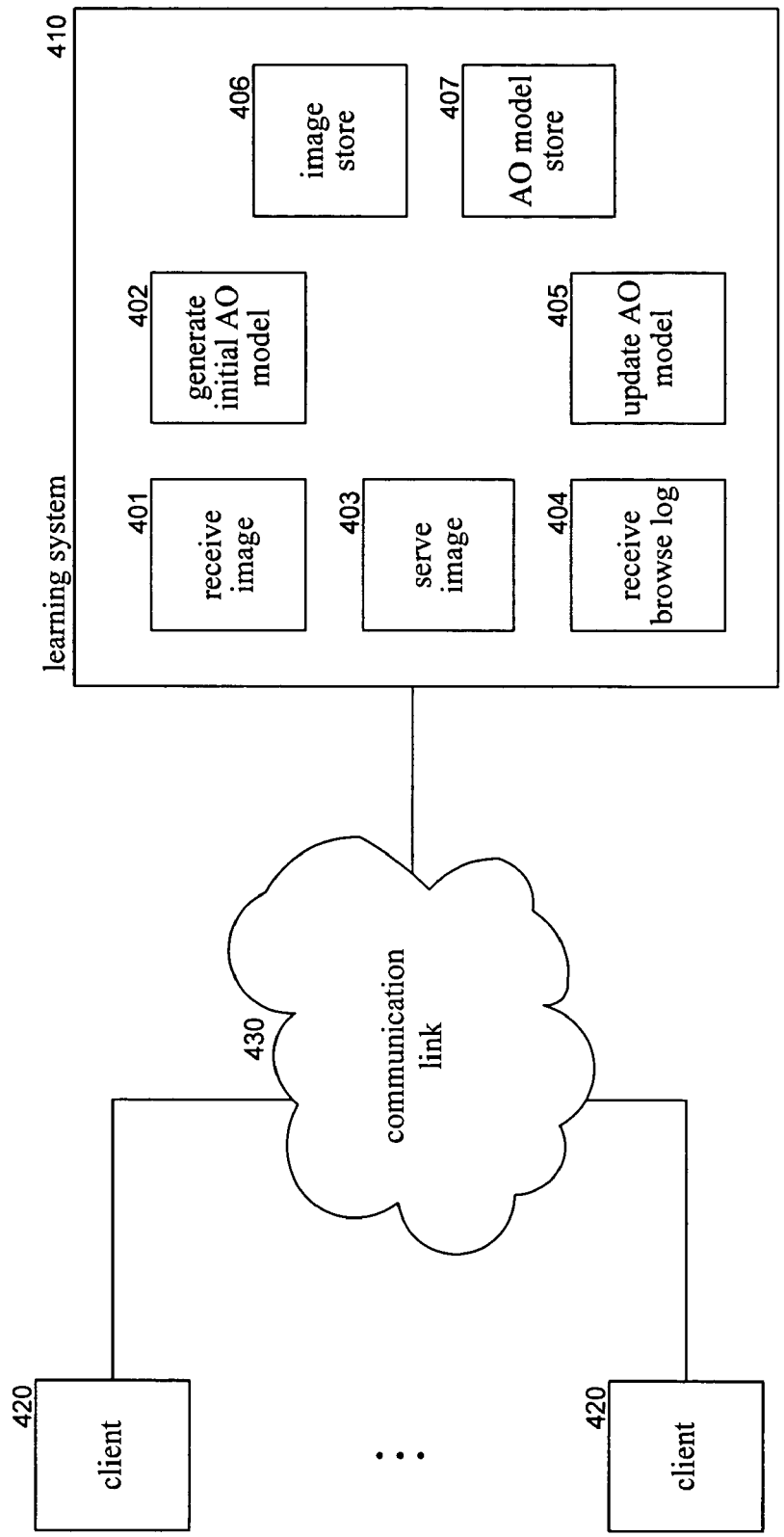
FIG. 4 is a block diagram that illustrates components of the learning system in one embodiment.

FIG. 4 is a block diagram that illustrates components of the learning system in one embodiment. The learning system 410 communicates with clients 420 via communication link 430. The clients may be mobile devices with small display areas. The communication link may be a wireless communication medium such as a cellular communication link. The learning system includes a receive image component 401, a generate initial attention object model component 402, a serve image component 403, a receive browse log component 404, and an update attention model component 405. The learning system also includes an image store 406 and an attention object model store 407. The receive image component receives images that are to be provided to the clients for display. The receive image component initially invokes the generate initial attention object model component to generate the initial attention object model based on static features of the image. The receive image component stores the received images in the image store and the generated initial attention object models in the attention object model store. Each image in the image store has a corresponding attention object model in the attention object model store. In an alternative embodiment, the learning system may not initialize an attention object model based on static features, but rather may use only user attention objects. The serve image component receives requests from the clients to provide images. The serve image component retrieves the images and the corresponding attention object models. The serve image component then provides the retrieved images and attention object models to the requesting clients. The receive browse log component receives browse logs from the clients after users have viewed images. The receive browse log component invokes the update attention object model component to generate a user interest map, identify primary attention objects, and update the attention object model for the image.

The clients may use the attention object model to direct the display of an image. The clients may also log the user navigation actions while viewing an image. The clients may log action type, focus point, display ratio, and time associated with the action. The action types may include zoom in and out and scroll up, down, left, and right. The focus point may be the center of the portion of the image that is currently being displayed. The display ratio indicates the current display ratio of the image. The time indicates the time of the action. The time between two successive actions indicates the duration of the first action.

In one embodiment, the learning system categorizes actions as transition actions or interesting actions. A transition action is an action whose goal is to move the viewing focus to the next interesting area of the image. Interesting actions occur when a user reaches some interesting area of the image and spends time focusing their attention on that area. The learning system factors in display ratio and action duration when determining whether an action is an interesting action. In one embodiment, the learning system establishes a minimum duration for an interesting action, which may be set on a user-by-user basis. In one embodiment, the learning system sets the minimum duration for an interesting action to two times the median duration minus the minimum duration, as indicated by the following equation:

$$T_{interest} = T_{med} + T_{med} - T_{min} \quad (3)$$

where $T_{interest}$ is the minimum duration of an interesting action, $T_{med}$ is the median duration of the actions in the browse log, and $T_{min}$ is the minimum duration of the actions in the browse log.

The computing device on which the learning system is implemented may include a central processing unit, memory, input devices (e.g., keyboard and pointing devices), output devices (e.g., display devices), and storage devices (e.g., disk drives). The memory and storage devices are computer-readable media that may contain instructions that implement the learning system. In addition, the data structures and message structures may be stored or transmitted via a data transmission medium, such as a signal on a communications link. Various communication links may be used, such as the Internet, a local area network, a wide area network, a point-to-point dial-up connection, or a cellphone network.

The learning system may be implemented in various operating environments that include personal computers, PDAs, cell phones, server computers, hand-held or laptop devices, multiprocessor systems, microprocessor-based systems, programmable consumer electronics, network PCs, minicomputers, mainframe computers, distributed computing environments that include any of the above systems or devices, and the like.

The learning system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 5:
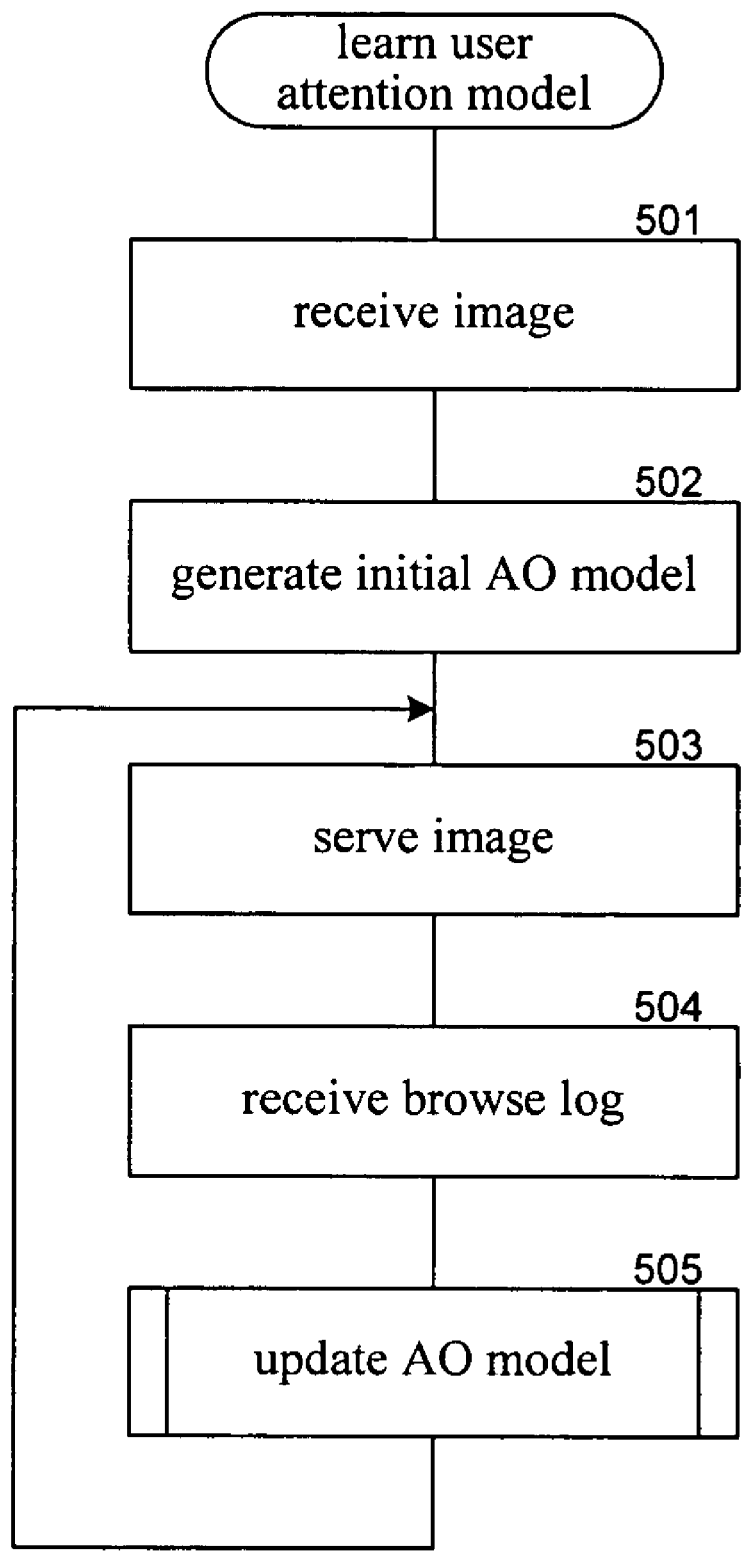
FIG. 5 is a flow diagram that illustrates the processing of the learning system in one embodiment.

FIG. 5 is a flow diagram that illustrates the processing of the learning system in one embodiment. In block 501, the learning system receives an image that is to be served to clients. In block 502, the learning system generates an initial attention object model based on static features of the image. In one embodiment, the learning system may apply the attention model to an image as defined in Chen L. Q., Xie X., et al., "A Visual Attention Model for Adapting Images on Small Displays," ACM Multimedia System Journal, vol. 9, no. 4, pp. 353-364, 2003, as U.S. patent application Ser. No. 10/286, 053, entitled "SYSTEMS AND METHODS FOR GENERATING A COMPREHENSIVE USER ATTENTION MODEL," filed on Nov. 1, 2002, which are hereby incorporated by reference. In blocks 503-505, the learning system loops serving images upon client requests and updating the attention object model based on user actions as reported in the browse logs. In block 503, the learning system serves the image to a client. In block 504, the learning system receives the browse log from the client. In block 505, the learning system updates the attention object model for the image and loops to block 503 to serve the next image.

Figure 6:
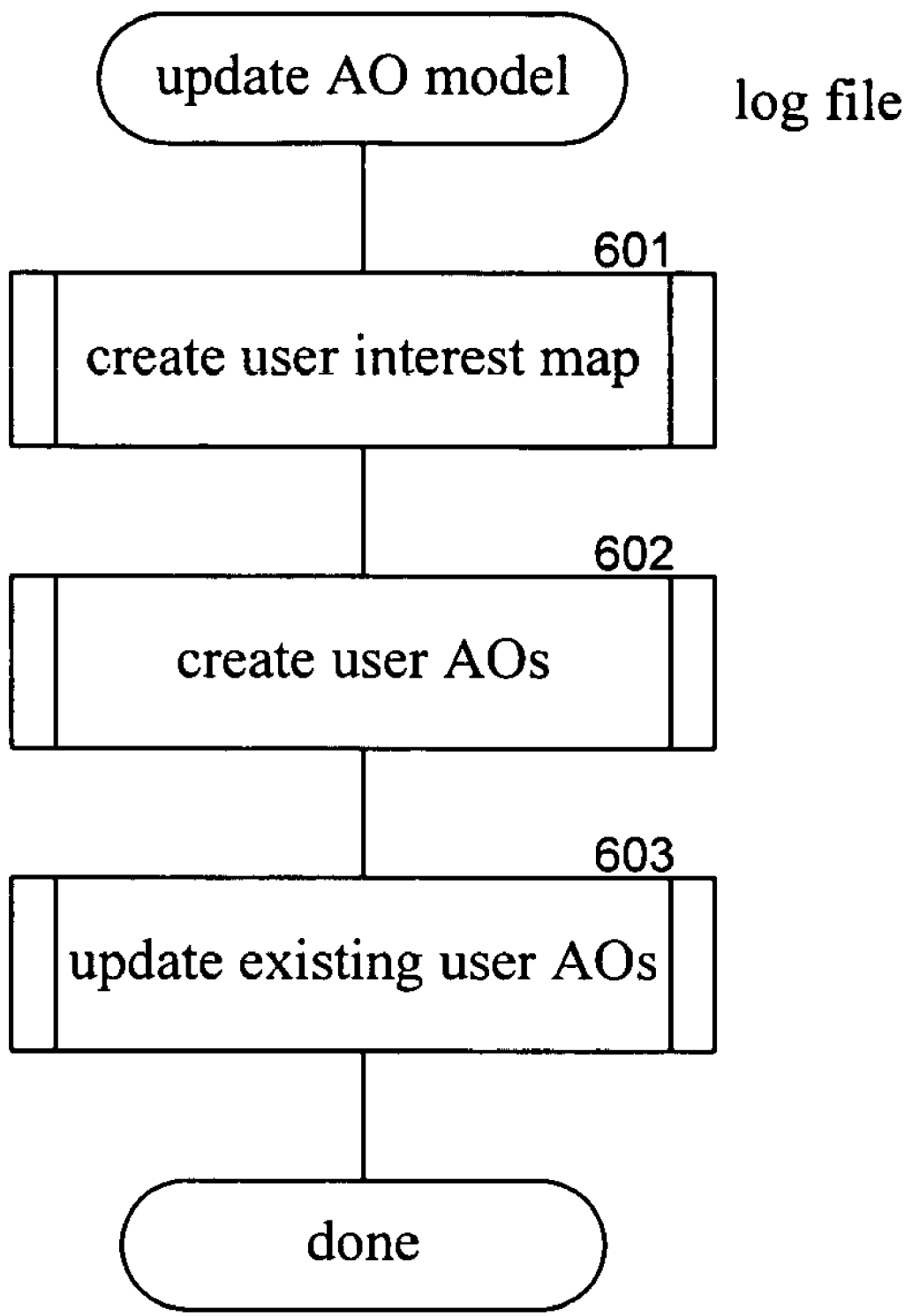
FIG. 6 is a flow diagram that illustrates the processing of the update attention object model component in one embodiment.

FIG. 6 is a flow diagram that illustrates the processing of the update attention object model component in one embodiment. The component is passed a browse log for an image and updates the attention object model for that image. In block 601, the component invokes a component to create a user interest map based on the passed browse log. In block 602, the component invokes a component to create the user attention objects (i.e., primary attention objects) from the user interest map. In block 603, the component invokes a component to update the existing user attention objects of the attention object model for the image based on the created user attention objects. The component then completes.

Figure 7:
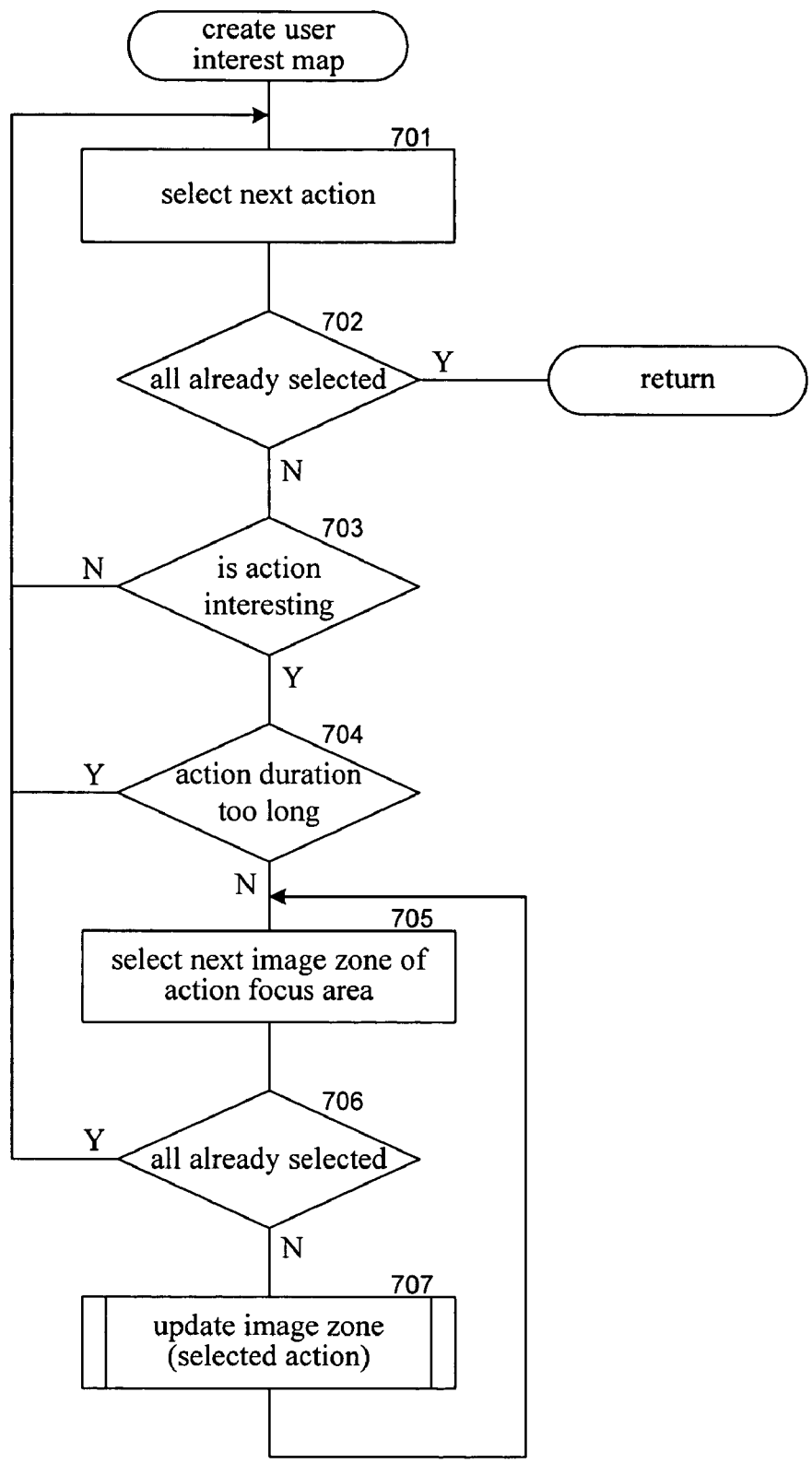
FIG. 7 is a flow diagram that illustrates the processing of the create user interest map component in one embodiment.

FIG. 7 is a flow diagram that illustrates the processing of the create user interest map component in one embodiment. The component is passed a browse log for an image and calculates the attributes for the image zones of the image based on the interesting actions of the browse log. In blocks 701-707, the component loops processing each action in the browse log. In block 701, the component selects the next action in the browse log. In decision block 702, if all the actions have already been selected, then the component returns, else the component continues at block 703. In decision block 703, if the selected action is interesting, then the component continues at block 704, else the component loops to block 701 to select the next action. In decision block 704, if the action duration is too long, then the component loops to block 701 to select the next action, else the component continues at block 705. A duration that is too long may indicate that a user diverted their attention to some activity unrelated to viewing the image. In blocks 705-707, the component loops updating each image zone that is within user view after the action is taken. In block 705, the component selects the next image zone that is within view. In decision block 706, if all the image zones within view have already been selected, then the component loops to block 701 to select the next action, else the component continues at block 707. In block 707, the component invokes the update image zone component passing the selected action to update the attributes of the selected image zone. The component then loops to block 705 to select the next image zone.

Figure 8:
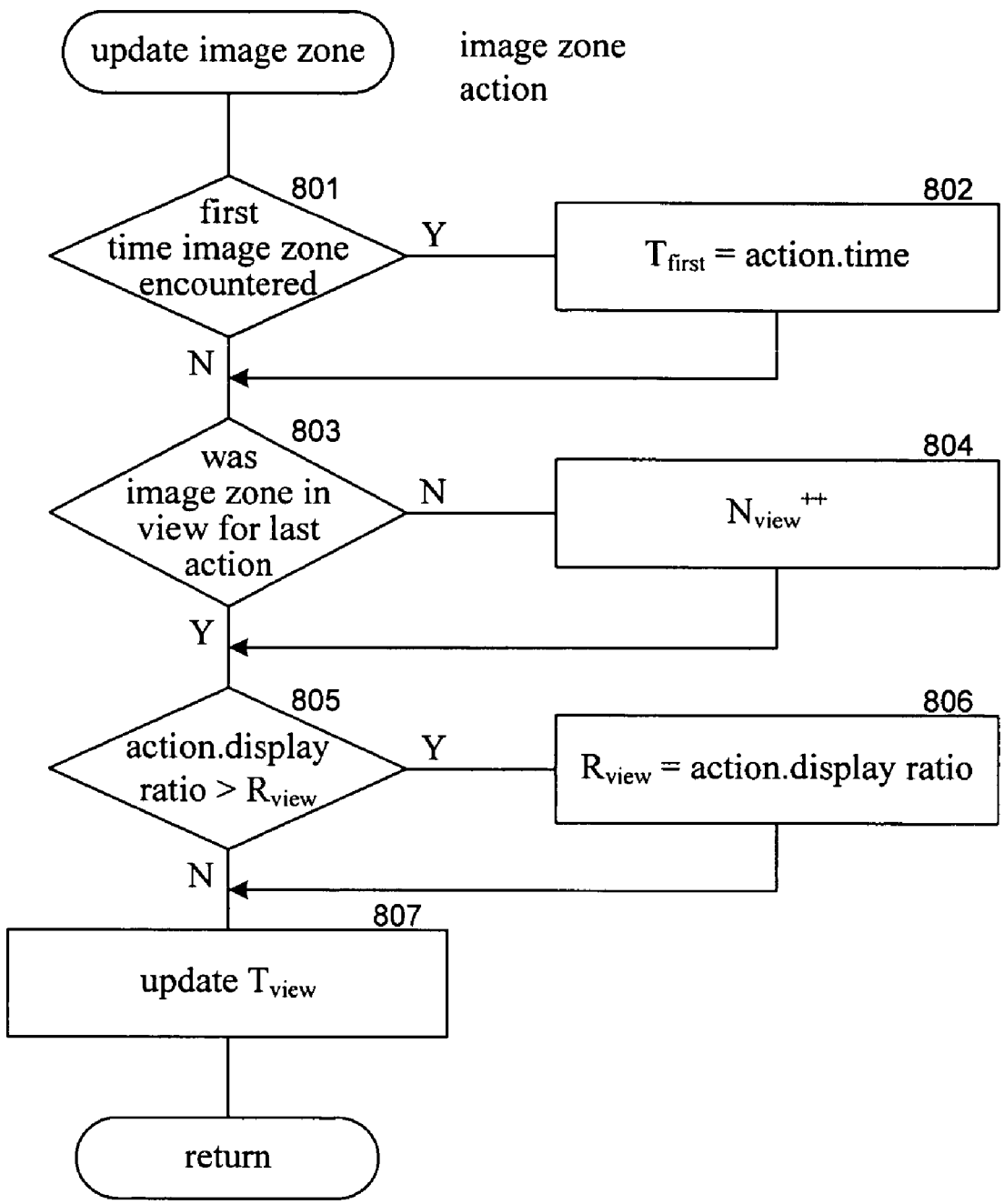
FIG. 8 is a flow diagram that illustrates the processing of the update image zone component in one embodiment.

FIG. 8 is a flow diagram that illustrates the processing of the update image zone component in one embodiment. The component is passed an indication of an image zone and an action. The component updates the attributes of the image zone based on the action. In decision block 801, if this is the first time that the image zone has been viewed based on the browse log, then the component continues at block 802, else the component continues at block 803. In block 802, the component sets the first view time (i.e., $T_{first}$) of the image zone to the time of the passed action. In decision block 803, if the image zone was in view for the last action, then the component continues at block 805, else this is a new viewing of the image zone and the component continues at block 804. In block 804, the component increments the number of viewings (i.e., $N_{view}$) of the image zone. In decision block 805, if the display ratio of the passed action is greater than the display ratio (i.e., $R_{view}$) of the image zone, then the component continues at block 806, else the component continues at block 807. In block 806, the component sets the display ratio of the image zone to the display ratio of the passed action. In block 807, the component updates the view time (i.e., $T_{view}$) of the image zone according to Equation (1). The component then returns.

Figure 9:
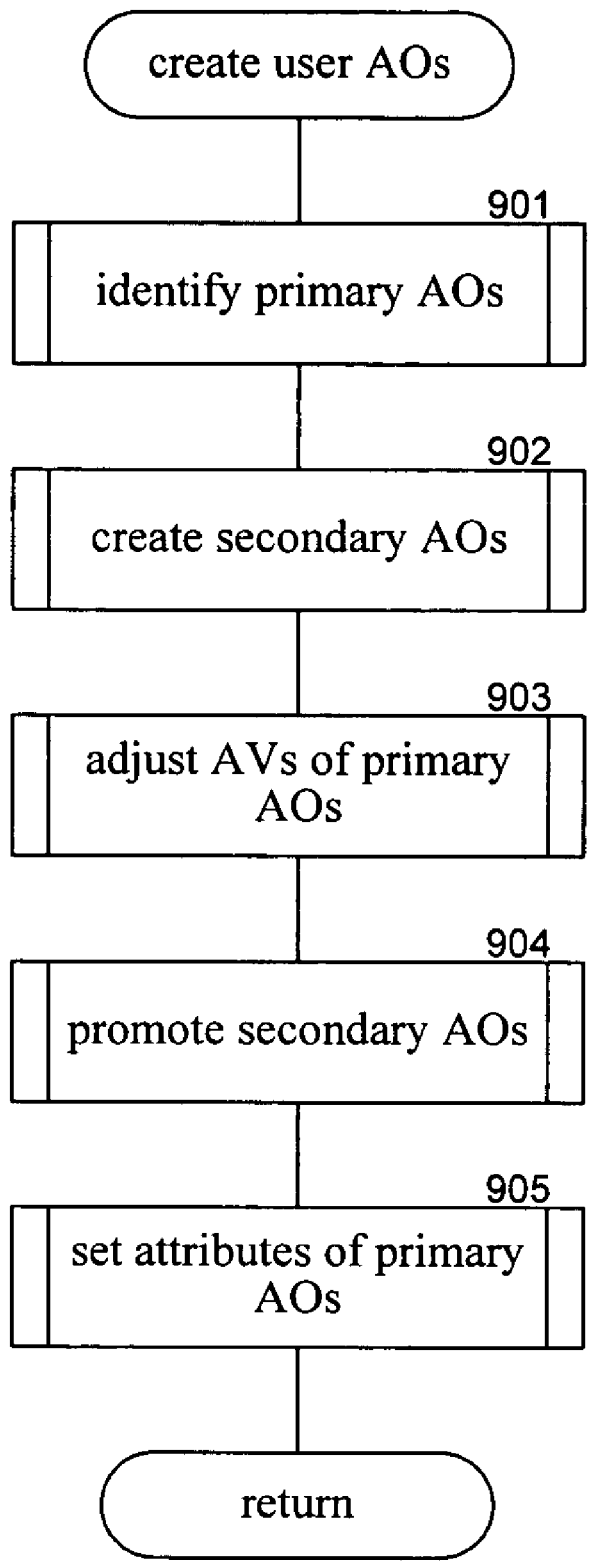
FIG. 9 is a flow diagram that illustrates the processing of the create user attention objects component in one embodiment.

FIG. 9 is a flow diagram that illustrates the processing of the create user attention objects component in one embodiment. In block 901, the component invokes the create primary attention objects component to create primary attention objects based on image zones with the highest interest scores. In block 902, the component invokes the create secondary attention objects component to create the secondary attention objects from the primary attention objects. In block 903, the component invokes the adjust attention values of primary attention objects component to factor in other characteristics of user actions that may indicate user interest (e.g., first area viewed). In block 904, the component invokes the promote secondary attention objects component to promote secondary attention objects to primary attention objects as appropriate. In block 905, the component invokes the set attributes of primary attention objects component and then returns.

Figure 10:
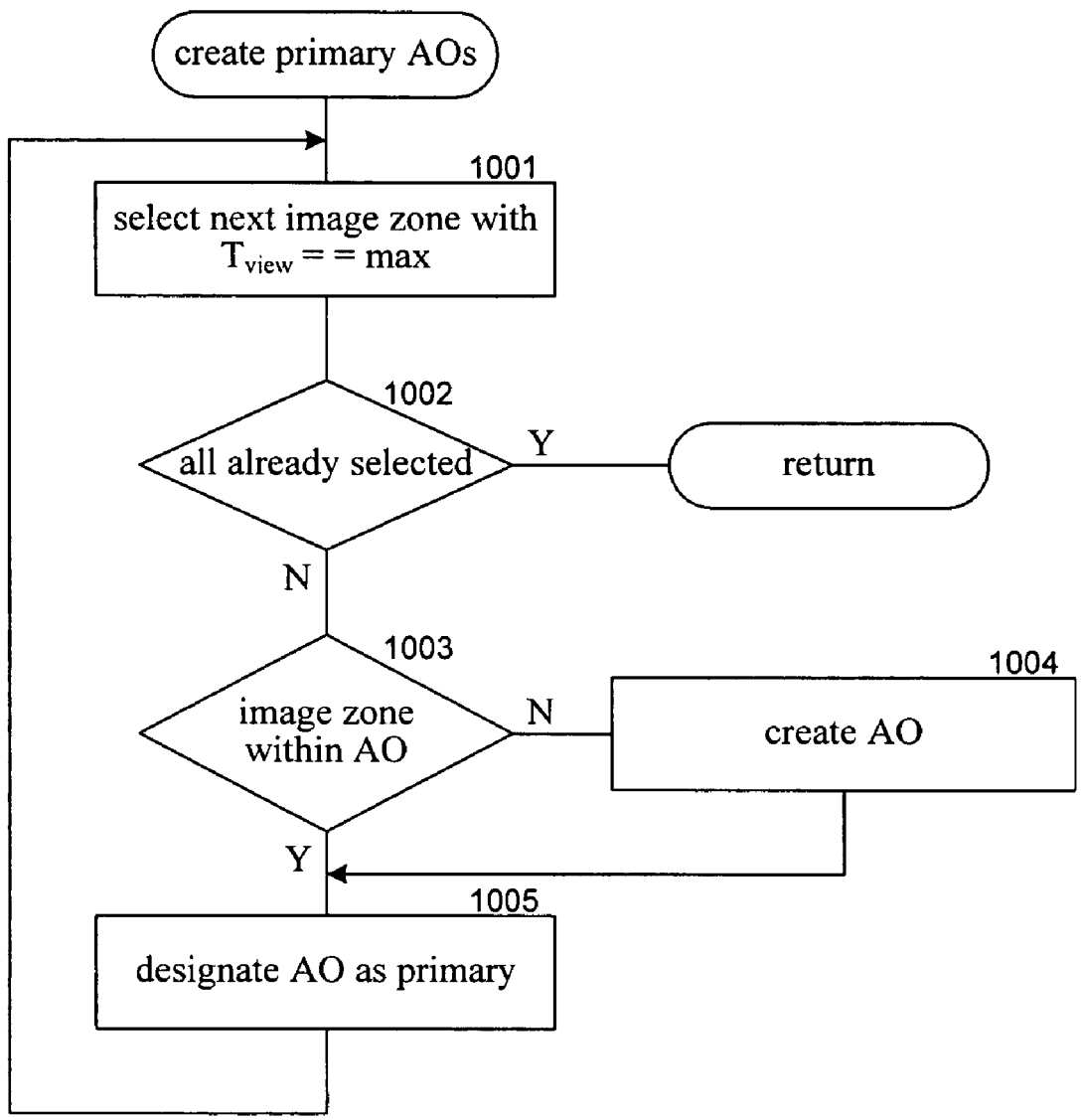
FIG. 10 is a flow diagram that illustrates the processing of the create primary attention objects component in one embodiment.

FIG. 10 is a flow diagram that illustrates the processing of the create primary attention objects component in one embodiment. The component loops selecting the image zones of the user interest map that have the highest interest score and designates them as primary attention objects. The component may select one or more image zones that have the highest interest score or may select multiple image zones that have interest scores that are close to the highest. In block 1001, the component selects the next image zone with the highest interest score. In decision block 1002, if all the image zones with the highest interest score have already been selected, then the component returns, else the component continues at block 1003. In decision block 1003, if the selected image zone is within an existing attention object of the attention object model, then the component continues at block 1005, else the component continues at block 1004. In block 1004, the component creates a new attention object based on the selected image zone. In block 1005, the component designates the attention object (either the enclosing or new attention object) as a primary attention object. The component then loops to block 1001 to select the next image zone.

Figure 11:
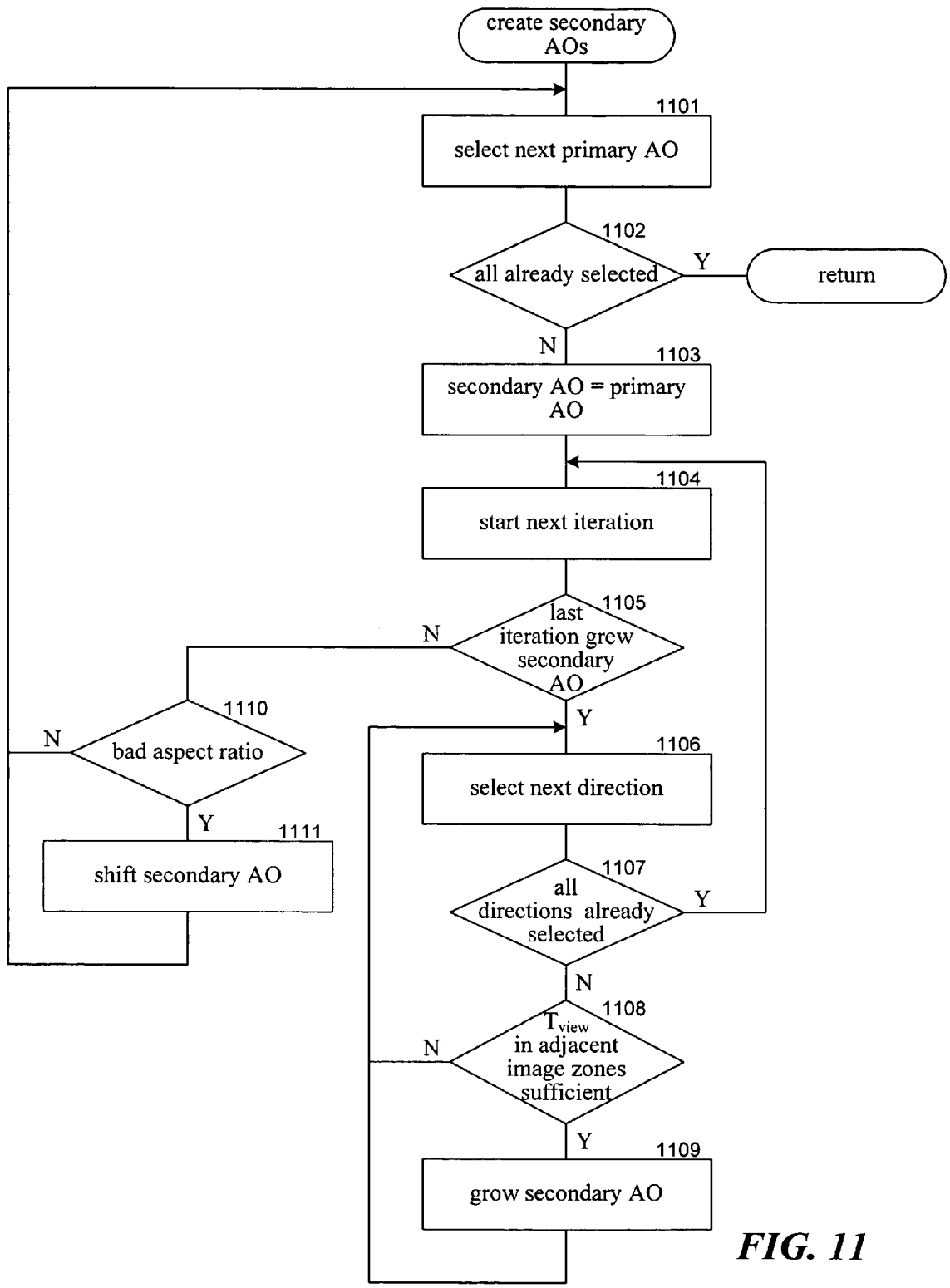
FIG. 11 is a flow diagram that illustrates the processing of the create secondary attention objects component in one embodiment.

FIG. 11 is a flow diagram that illustrates the processing of the create secondary attention objects component in one embodiment. The component generates a secondary attention object from each primary attention object and then grows the secondary attention objects. In block 1101, the component selects the next primary attention object. In decision block 1102, if all the primary attention objects have already been selected, then the component returns, else the component continues at block 1103. In block 1103, the component sets a secondary attention object to the primary attention object. In blocks 1104-1109, the component loops growing the secondary attention object in each direction if possible. In block 1104, the component starts the next iteration of growing the secondary attention object. In decision block 1105, if the last iteration grew the secondary attention object in at least one direction, then the component continues at block 1106, else the growth is complete and the component continues at block 1110. In blocks 1106-1109, the component loops selecting each direction and attempting to grow the secondary attention object in that direction. In block 1106, the component selects the next direction. In decision block 1107, if all the directions have already been selected, then the component loops to block 1104 to start the next iteration, else the component continues at block 1108. In decision block 1108, if the interest score of the adjacent image zones in the selected direction is sufficient for growth of the secondary attention object, then the component continues at block 1109, else the component loops to block 1106 to select the next direction. In block 1109, the component grows the secondary attention object in the selected direction and loops to block 1106 to select the next direction. In decision block 1110, if the secondary attention object has a bad aspect ratio (i.e., a width or height that is too narrow), then the component continues at block 1111, else the component loops to block 1101 to select the next primary attention object. In block 1111, the component adjusts the secondary attention object to correct its aspect ratio and then loops to block 1101 to select the next primary attention object.

Figure 12:
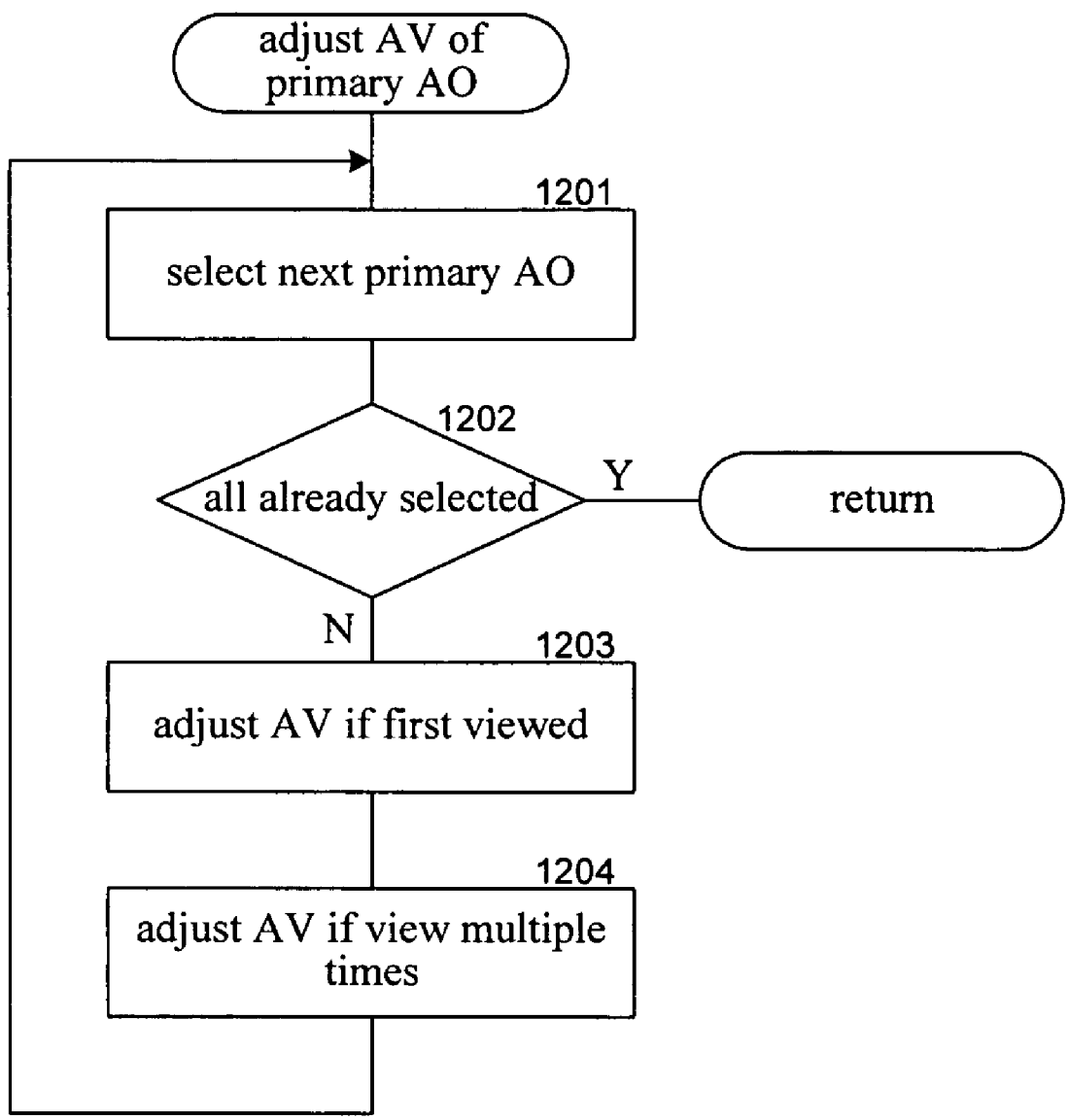
FIG. 12 is a flow diagram that illustrates the processing of the adjust attention values of primary attention objects component in one embodiment.

FIG. 12 is a flow diagram that illustrates the processing of the adjust attention values of primary attention objects component in one embodiment. The component adjusts the attention values to factor in various characteristics of user actions such as whether the primary attention object is the area first viewed by the user or was viewed multiple times by the user. In block 1201, the component selects the next primary attention object. In decision block 1202, if all the primary attention objects have already been selected, then the component returns, else the component continues at block 1203. In block 1203, the component increases the attention value of the selected primary attention object if it is within the area first viewed by the user and does not already have the highest attention value. In block 1204, the component increases the attention value of the selected primary attention object if it was viewed multiple times by the user. The attention value may be increased in proportion to the number of times viewed. The component then loops to block 1201 to select the next primary attention object.

Figure 13:
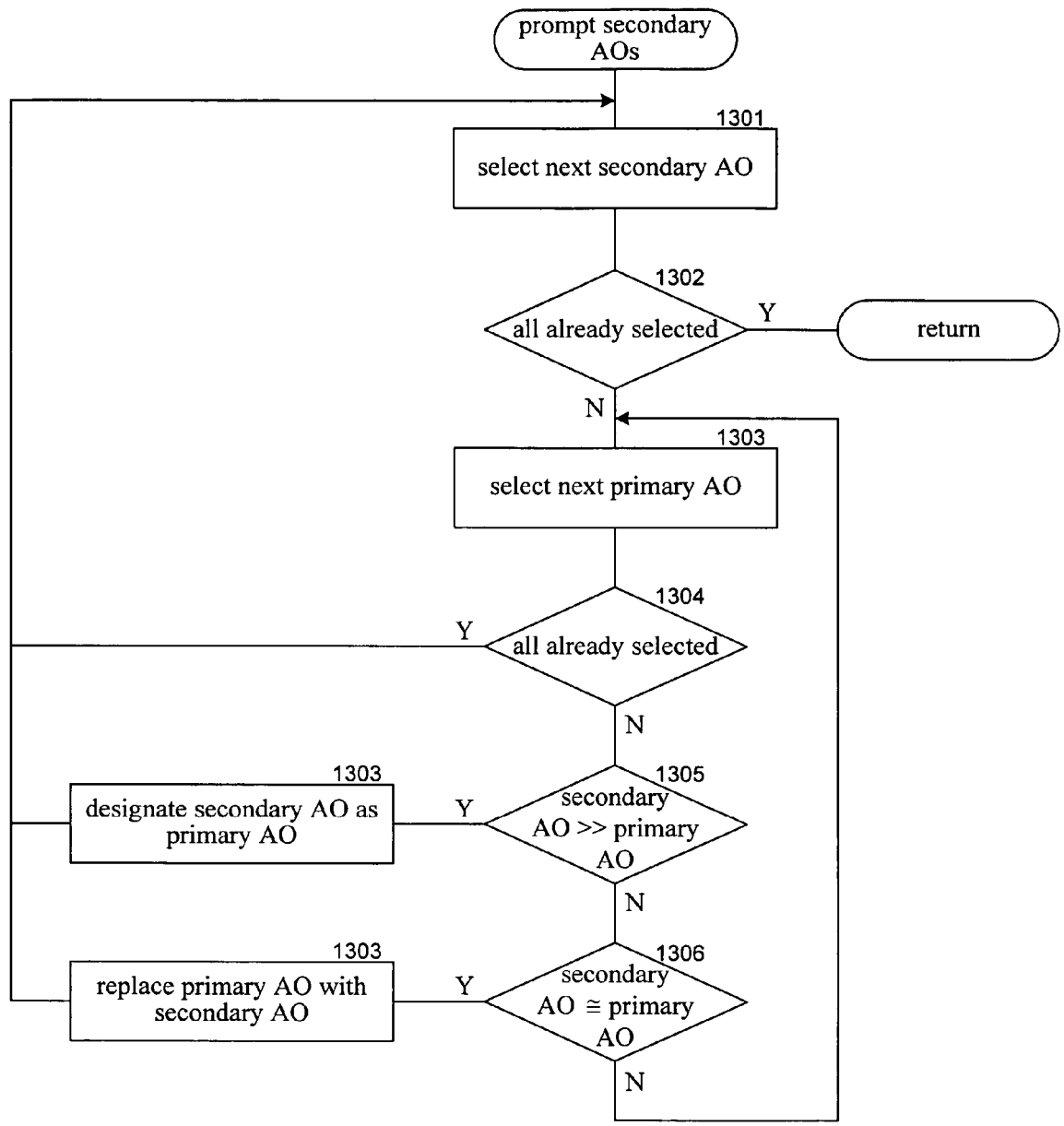
FIG. 13 is a flow diagram that illustrates the processing of the promote secondary attention objects component in one embodiment.

FIG. 13 is a flow diagram that illustrates the processing of the promote secondary attention objects component in one embodiment. The component promotes a secondary attention object to a primary attention object when the secondary attention object is significantly larger or minimally larger than an enclosed primary attention object. If the secondary attention object is minimally larger, the component removes the enclosed primary attention object to effect a replacement of the primary attention object with the secondary attention object. In block 1301, the component selects the next secondary attention object. In decision block 1302, if all the secondary attention objects have already been selected, then the component returns, else the component continues at block 1303. In blocks 1303-1308, the component loops selecting each primary attention object and comparing it to the selected secondary attention object. In block 1303, the component selects the next primary attention object. In decision block 1304, if all the primary attention objects have already been selected for the selected secondary attention object, then the component loops to block 1301 to select the next secondary attention object, else the component continues at block 1305. In decision block 1305, if the selected secondary attention object encloses and is significantly larger than the selected primary attention object, then the component continues at block 1307, else the component continues at block 1306. In decision block 1306, if the selected secondary attention object encloses and is minimally larger than the selected primary attention object, then the component continues at block 1308, else the component loops to block 1303 to select the next primary attention object. In block 1307, the component designates the selected secondary attention object as a primary attention object and then loops to block 1301 to select the next secondary attention object. One skilled in the art will appreciate that such a designation may occur only if the selected secondary attention object is significantly larger than all enclosed primary attention objects. In block 1308, the component replaces the selected primary attention object with the selected secondary attention object and then loops to block 1301 to select the next secondary attention object.

Figure 14:
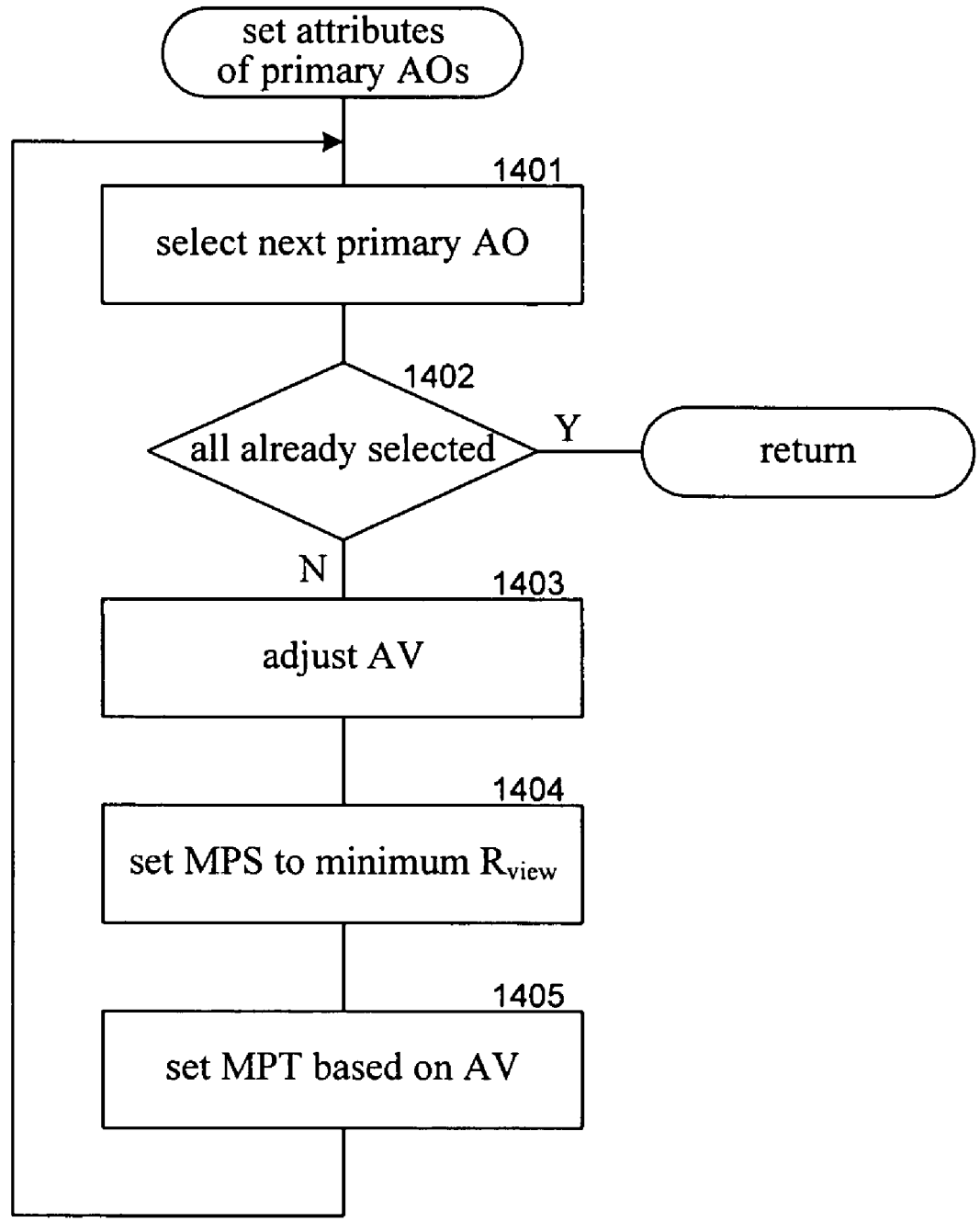
FIG. 14 is a flow diagram that illustrates the processing of the set attributes of primary attention objects component in one embodiment.

FIG. 14 is a flow diagram that illustrates the processing of the set attributes of primary attention objects component in one embodiment. In block 1401, the component selects the next primary attention object. In decision block 1402, if all the primary attention objects have already been selected, then the component returns, else the component continues at block 1403. In block 1403, the component adjusts the attention value of the selected primary attention object. In one embodiment, the component adjusts the attention value to be at least as high as a face attention object based on static features of an image. User attention objects may be considered to be a more accurate representation of user interest than attention objects derived from static features. In block 1404, the component sets the minimum perceptible size of the primary attention object to the minimum display ratio of the contained image zones. In block 1405, the component sets the minimum perception time based on the attention value and then loops to block 1401 to select the next primary attention object.

Figure 15:
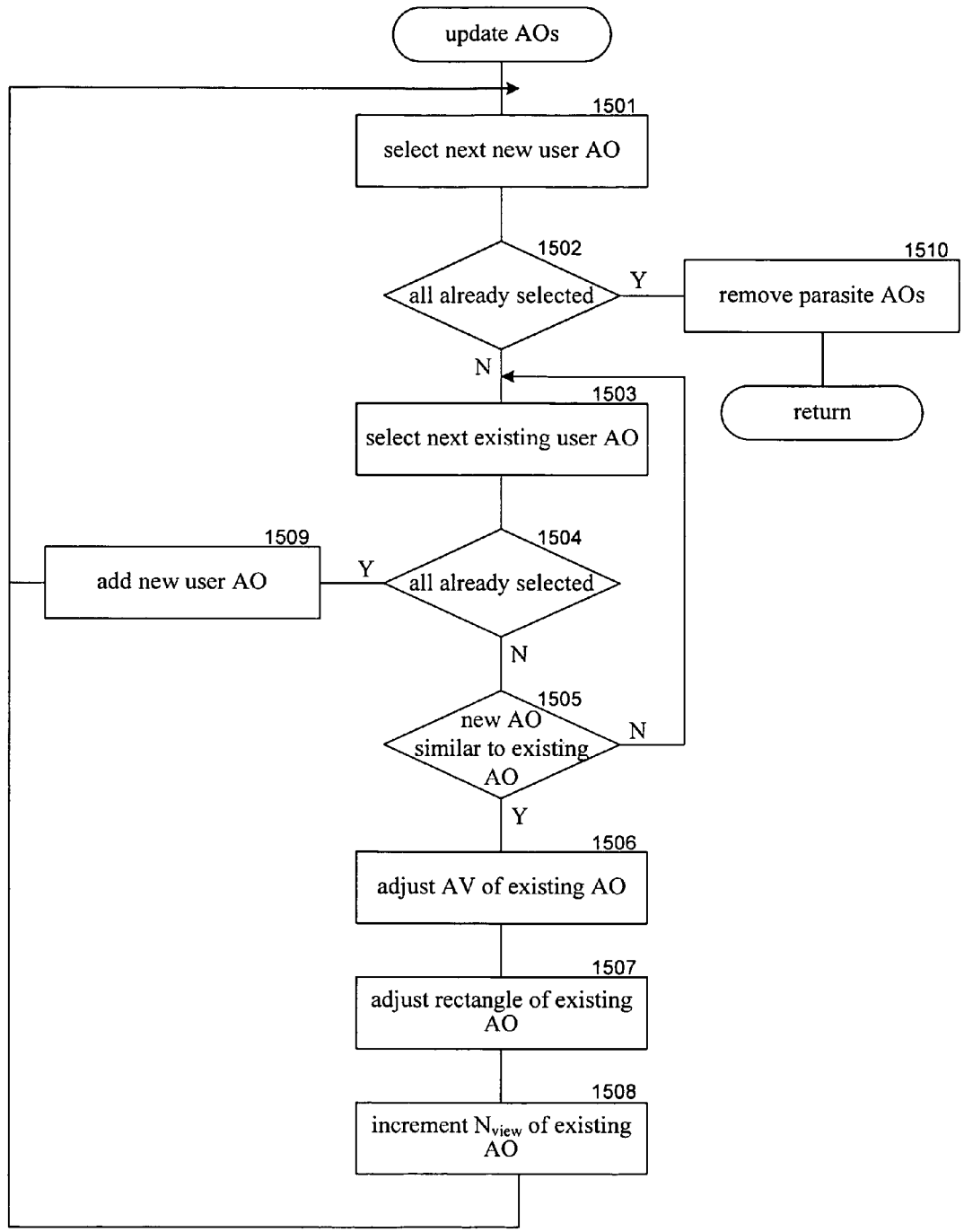
FIG. 15 is a flow diagram that illustrates the processing of the update attention objects component in one embodiment.

FIG. 15 is a flow diagram that illustrates the processing of the update attention objects component in one embodiment. This component adjusts the attention object model for an image based on the primary attention objects. In block 1501, the component selects the next new user attention object (i.e., primary attention object). In decision block 1502, if all the new user attention objects have already been selected, then the component continues at block 1510, else the component continues at block 1503. In block 1503, the component selects the next existing user attention object from the attention object model stored in the attention object model store. In block 1504, if all the existing user attention objects have already been selected for the selected new user attention object, then the component continues at block 1509, else the component continues at block 1505. In decision block 1505, if the selected new user attention object is similar to the selected existing user attention object, then the component continues at block 1506, else the component loops to block 1503 to select the next existing user attention object. In block 1506, the component adjusts the attention value of the existing user attention object to factor in the attention value of the new user attention object (e.g., running average of the attention values). In block 1507, the component adjusts a region of interest of the selected existing user attention object based on the new user attention object. In block 1508, the component increments the number of views of the existing user attention object and then loops to block 1501 to select the next new user attention object. In block 1509, the component adds the selected new user attention object to the attention object model and then loops to block 1501 to select the next new user attention object. In block 1510, the component removes parasite attention objects and then returns. A parasite attention object is an attention object that has been viewed less than a certain fraction of the viewing time of the attention object with the highest viewing time.

One skilled in the art will appreciate that although specific embodiments of the learning system have been described herein for purposes of illustration, various modifications may be made without deviating from the spirit and scope of the invention. For example, the learning system may use different factors to calculate interest scores and attention values. The learning system may also define "interesting action" in different ways. Accordingly, the invention is not limited except by the appended claims.

We claim:

1. A method performed by a computer for learning an attention model for an image, the method comprising:
   receiving indications of actions of a user while viewing the image and indications of action focus areas of the image currently being viewed to which the actions relate; and
   generating by the computer the attention model based on the actions of the user, the attention model identifying attention objects of the image, an attention object corresponding to an area of the image in which the user has expressed interest based on the actions of the user while viewing the image, the attention objects being identified by
      dividing the image into images zones such that the image zones encompass the entire image, each image zone having an interest score indicating interest of the user in the image zone:
      for each indication of an action,
         for each image zone within the action focus area of the action, updating the interest score for the image zone based on the indicated action;
      identifying as initial attention objects those image zones with interest scores indicating the user expressed most interest in those image zones;
      expanding the initial attention objects by adding adjacent image zones with an interest score indicating a threshold interest in the adjacent image zones; and
      designating an expanded attention object as an attention object for the image.

2. The method of claim 1 including generating an initial attention model based on static features of the image and wherein the generating of the attention model based on the actions of the user includes updating the attention model.

3. The method of claim 1 wherein the indications compose a browse log of actions of the user collected while the user viewed the image.

4. The method of claim 1 wherein the attention model includes attention objects and the generating of the attention model includes:
   generating a user interest map of areas of the image of user interest as determined from the actions of the user;
   creating attention objects of the image based on the user interest map; and
   updating attention objects of the attention model based on the created attention objects.

5. The method of claim 4 wherein the user interest map is generated by identifying image zones of the image in which the actions indicate user interest.

6. The method of claim 5 wherein an image zone has attributes that include a time first viewed, a number of views, a display ratio, and a time of action.

7. The method of claim 5 wherein an image zone has an attribute that represents a number of interesting actions relating to the image zone.

8. The method of claim 5 wherein an image zone has an attribute that represents a display ratio.

9. The method of claim 5 wherein an image zone has an attribute that represents time of action.

10. The method of claim 4 wherein the creating of attention objects includes:
    identifying primary attention objects based on viewing duration;
    identifying secondary attention objects derived from the primary attention objects that represent a larger attention object; and
    modifying the identified primary attention objects based on the identified secondary attention objects.

11. The method of claim 4 wherein the updating of attention objects of the attention model includes:
    when a new attention object is similar to an existing attention object, modifying attributes of the existing attention object based on attributes of the new attention object; and
    when a new attention object is not similar to an existing attention object, adding the new attention object to the attention model.

12. The method of claim 4 wherein:
    the generating of a user interest map includes identifying image zones of the image in which the actions indicate user interest;
    the creating of attention objects includes identifying primary attention objects based on viewing duration, identifying secondary attention objects derived from the primary attention objects that represent a larger attention object, and modifying the identified primary attention objects based on the identified secondary attention objects; and
    the updating of attention objects of the attention model includes when a new attention object is similar to an existing attention object, modifying attributes of the existing attention object based on attributes of the new attention object, and when a new attention object is not similar to an existing attention object, adding the new attention object to the attention model.

13. A computer-implemented method for identifying user interest in an image, the method comprising:
    receiving indications of actions of a user while viewing the image;
    dividing the image into image zones;
    identifying actions of the user that indicate user interest in the image;
    for identified actions,
       determining by a computer an image zone of the image associated with the action; and
       indicating by the computer that the determined image zone is of user interest by updating an interest score for the image zone; and
    identifying attention objects of the image by
       identifying by the computer as initial attention objects those image zones with interest scores indicating the user expressed most interest in those image zones;

expanding by the computer the initial attention objects by adding adjacent image zones with an interest score indicating a threshold interest in the adjacent image zones; and designating an expanded attention object as an attention object for the image.

14. The method of claim 13 wherein when an identified action is associated with multiple image zones, indicating that the multiple image zones are of user interest.

15. The method of claim 13 wherein the indicating that the determined image zone is of user interest includes setting an interest score.

16. The method of claim 15 wherein the interest score is a weighted viewing time.

17. The method of claim 16 wherein the viewing time is weighted based on distance of image zone from focus point of the identified action.

18. The method of claim 13 wherein indicating that the determined image zone is of user interest includes setting a display ratio for the image zone.

19. The method of claim 13 wherein indicating that the determined image zone is of user interest includes setting a number of different viewings of the image zone.

20. The method of claim 13 wherein indicating that the determined image zone is of user interest includes setting a first time of viewing the image zone.

21. A computer-implemented method for identifying attention objects of an image, the method comprising:

receiving indications of actions of a user while viewing the image;

identifying actions of the user that indicate user interest; and defining areas associated with the identified actions as attention objects of the image by:

generating by a computer a user interest map having image zones and an interest score for each image zone, the interest score for an image zone indicating user interest in the image zone as indicated by the identified actions;

for each image zone of the user interest map with an interest score indicating a primary threshold level of user interest, designating that image zone as an attention object; and for each attention object that has been designated, when an image zone that is adjacent to that attention object has an interest score indicating a secondary threshold level of user interest, expanding that attention object to include that adjacent image zone.

22. The method of claim 21 wherein user interest is based on time between actions.

23. The method of claim 21 wherein the defining includes selecting areas as attention objects based on time the user spent viewing the areas.

24. The method of claim 23 including setting an attention value of an attention object based on time the user spent viewing the area.

25. The method of claim 21 wherein the defining includes growing an area based on time the user spent viewing adjacent areas.

26. The method of claim 21 wherein the identifying of attention objects is based on actions of multiple users.

27. A computer-readable storage medium containing instructions for controlling a computer system to learn an attention model for an image, by a method comprising:

generating an attention model based on static features of the image, the attention model identifying attention objects of the image that may be of interest to a user;

displaying the image to a plurality of users;

for each of the plurality of users to whom the image is displayed, receiving indications of actions of that user while viewing the image; and updating the attention model based on the actions of the users by:

generating a user interest map having image zones and an interest score for each image zone, the interest score for an image zone indicating user interest in the image zone as indicated by the received indications of user actions;

for each image zone of the user interest map with an interest score indicating a primary threshold level of user interest, when the image zone is within an attention object of the attention model, designating that attention object as a primary attention object; and when the image zone is not within an attention object of the attention model, designating that image zone as a primary attention object; and for each primary attention object that has been designated, when an image zone that is adjacent to that primary attention object has an interest score indicating a secondary threshold level of user interest, expanding that attention object to include that adjacent image zone; and providing the updated attention model for use in displaying the image.

28. The computer-readable storage medium of claim 27 wherein the indications compose a browse log of actions of the user collected while the user viewed the image.

29. The computer-readable storage medium of claim 27 wherein an image zone has attributes that include a time first viewed, a number of views, a display ratio, and a time viewed.

30. The computer-readable storage medium of claim 27 wherein an image zone has an attribute that represents a number of interesting actions relating to the image zone.

31. The computer-readable storage medium of claim 27 wherein an image zone has an attribute that represents a display ratio.

32. The computer-readable storage medium of claim 27 wherein an image zone has an attribute that represents time viewed.

33. The computer-readable storage medium of claim 27 wherein the updating of attention objects of the attention model includes:

when a new attention object is similar to an existing attention object, modifying attributes of the existing attention object based on attributes of the new attention object; and when a new attention object is not similar to an existing attention object, adding the new attention object to the attention model.

* * * * *